July 29, 1958     O. H. KNOWLTON, JR., ET AL     2,845,532
CIRCUIT FOR ELIMINATING THE HYSTERESIS EFFECT
RESULTING FROM TIME DELAYS INHERENT
IN TRACK-WHILE-SCAN SYSTEMS
Filed Feb. 28, 1955
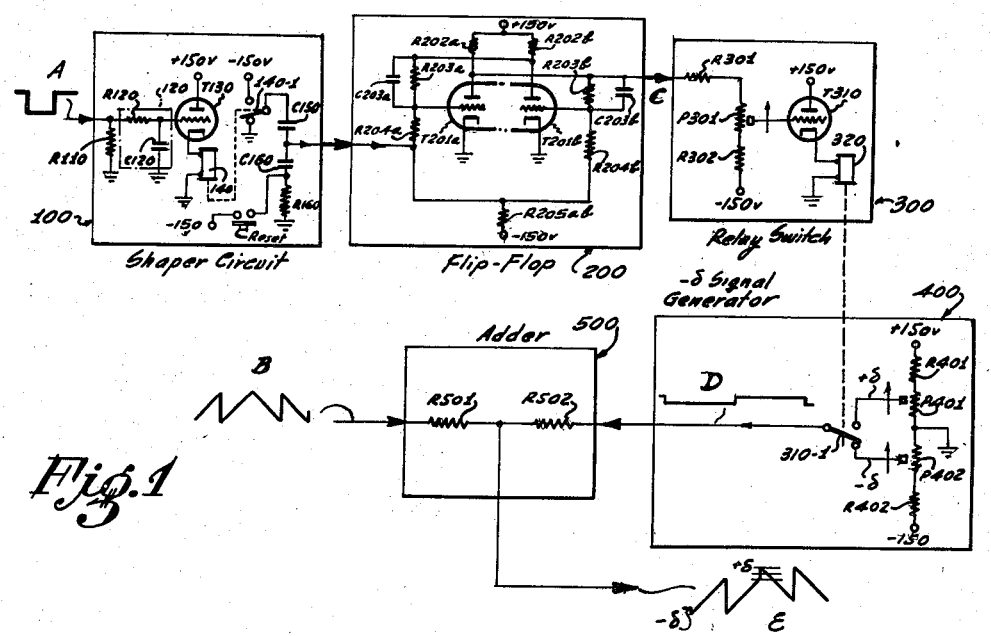
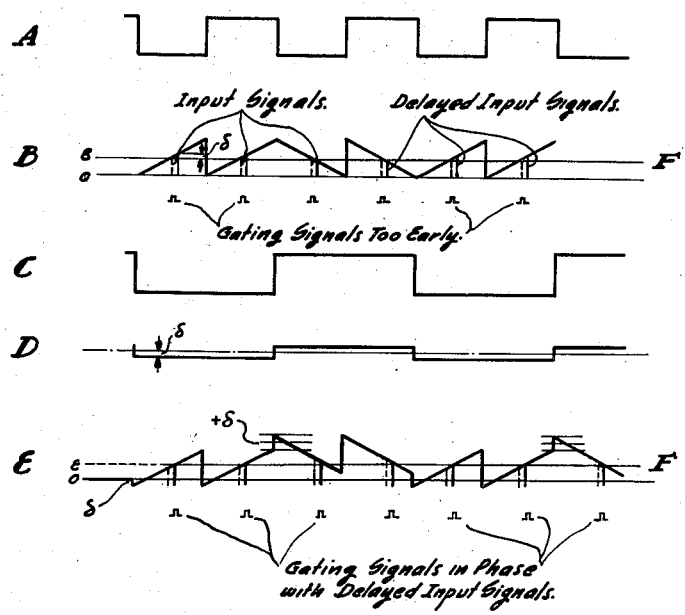
INVENTORS:
Orin Henry Knowlton, Jr.
Lloyd David Ball
Patent Attorney United States Patent Office 2,845,532
Patented July 29, 1958

2,845,532

CIRCUIT FOR ELIMINATING THE HYSTERESIS EFFECT RESULTING FROM TIME DELAYS INHERENT IN TRACK-WHILE-SCAN SYSTEMS

Orin Henry Knowlton, Jr., and Lloyd David Ball, Los Angeles, Calif., assignors to Gilfillan Bros. Inc., Los Angeles, Calif., a corporation of California Application February 28, 1955, Serial No. 491,062

8 Claims. (Cl. 250—27)

This invention relates to a circuit for eliminating the hysteresis effect resulting from time delays inherent in track-while-scan systems and, more particularly, to a circuit for reducing or eliminating the error which results in tracking coincidence circuits when a varying scan-indicating signal is compared with a fixed scan-position signal to generate a gating signal.

While the invention may have a multitude of applications, it is particularly useful in systems where an angle signal representing the angular position of a radar scanning beam is compared with a signal representing an angular position desired to provide an angle gating signal which may be utilized in a range or angle computing operation. Systems of this type are described in copending applications: U. S. patent application Serial No. 265,977 for "Range and Angle Tracking of Aircraft Using Angle Gated Video," by Alvin Guy Van Alstyne, filed January 11, 1952; and U. S. patent application Serial No. 492,627 for "Velocity Tracking System for Increasing the Range of Acquisition of Moving Targets," by Lloyd David Ball et al., filed March 7, 1955.

Tracking errors referred to hereinafter as δ delays occur in these systems due to the generation of stretched video and/or to filtering which may be required to improve the signal-to-noise ratio, as in the system by Ball et al. above. These operations introduce certain time delays with respect to target-indicating signals which are received, with the result that any angle gating signal which is generated occurs too early. Thus effectively an error of δ is added when the angle scanning voltage is increasing and an error of δ is subtracted when the angle scanning voltage is decreasing. The effect may be referred to herein as a type of hysteresis since the magnitude of the resulting signal is different during increases from the magnitude of the signal during decreases.

The present invention provides a simple and efficient solution to the hysteresis problem inherent in such systems. According to the present invention compensating positive and negative step signals are produced corresponding to the amplitude variation of the scanning signal during the error delay which is introduced in the system. Thus a negative step signal is generated to compensate for the early occurrence of the angle gating signals during the increasing period of the scanning signal, where the magnitude of the negative step is selected to correspond to the change in scanning signal amplitude during the error delay introduced. In a similar manner a positive step signal is provided during decreasing portions of the scanning signal so that the scanning signal is effectively delayed by an amount compensating for the otherwise early occurrence of an angle gating signal.

The positive and negative compensating step signals are combined with the normally generated scanning signal to provide a composite signal which when utilized in an angle gating circuit provides angle gating signals which are properly phased with respect to the actual target positions.

Accordingly, it is an object of the present invention to provide a simple circuit for eliminating the hysteresis effect resulting from time delays introduced by video stretching and/or filtering circuits.

Another object of the invention is to provide a circuit for modifying scan-indicating input signals to compensate for expected errors due to time delays in the system of utilization.

A further object of the invention is to provide an efficient circuit for introducing compensating signals to reduce the δ delays inherent in track-while-scan systems.

A more specific object is to provide a circuit for reducing or eliminating the hysteresis problem inherent in tracking systems by combining compensating positive and negative step signals, corresponding to the amplitude variation of the scanning signal during an error delay, with the normal scanning signal to produce a modified scanning signal, which may be utilized to provide gating signals positioned in time according to the error delay.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Fig. 1 is a schematic diagram of a hysteresis eliminating circuit according to the present invention; and Fig. 1a is a composite set of waveforms indicating various signals which occur in the circuit of Fig. 1 during its operation.

Reference is now made to Fig. 1 wherein the basic embodiment of the invention is shown in schematic form with a block diagram indication being provided to indicate the major components. As indicated in Fig. 1, the basic embodiment includes a shaper circuit 100 which receives a synchronizing signal A representing the scanning periods of a scanning signal B. The time relationship between signals A and B is indicated in Fig. 1a.

Signal A is shaped through circuit 100 and applied to flip-flop circuit 200, the input circuit of flip-flop 200 being effective to differentiate the square wave signal produced by shaper circuit 100. Flip-flop 200 is triggered upon each occurrence of a negative going portion of the differentiated input signal received and consequently is operative to frequency divide the input signal to provide an output signal C of one-half frequency. The relationship between signals A and C is shown more clearly in Fig. 1a.

The output signal C produced by circuit 200 is applied to a relay switch circuit 300 including a cathode follower stage 310 and a relay 320. Relay switch circuit 300 provides an actuating control for a δ signal generator circuit 400 which provides positive and negative δ signals in response to switch-close and switch-open control signals provided by circuit 300. The δ step signals produced by circuit 400 are designated as signals D and are also shown in Fig. 1a. The step signals D are then added to, or combined with, the input signals B in an adder circuit 500 which produces a composite output signal E formulated to eliminate the expected hysteresis effect in the utilizing system.

Before considering the specific circuit arrangement shown, it will be helpful to consider the general operation of the invention, reference being made to the general block diagram form of Fig. 1 and the operating waveforms of Fig. 1a. The input signal B may be assumed to represent an angle voltage signal utilized to represent elevation and azimuth scanning in a system of the type described in the above mentioned copending application by Van Alstyne. It will be noted that this signal includes two successively increasing scanning signals corresponding to the increasing angles of elevation and azimuth and then includes two successively decreasing scanning signals corresponding to the successively decreasing scans in elevation and azimuth.

Since the change from increasing scan to decreasing scan occurs at one-half the frequency of the scan synchronizing signal A, it is necessary to divide this frequency by two as is accomplished in flip-flop 200. It will be understood, however, that where the alteration between increasing and decreasing scanning functions is accomplished once for each period of synchronizing signal A, the frequency division operation is not necessary. Thus if scanning were performed only in elevation or only in azimuth, synchronizing signal A could be utilized directly to control relay switch 300 and the positive and negative step signals would be varied directly as signal A.

It will be noted that a fixed scan position signal level F is shown in Fig. 1a where the level of signal F represents a desired scan position. Thus in a normal operation the intersection of the line representing the level of signal F with the varying scan signal B indicates the time that an angle gating signal would be produced. However, it will be noted in Fig. 1a that this intersection provides gating signals as indicated. It will further be noted that during the period between an input signal and a following delayed input signal, signal B increases in voltage by an amount δ during the increasing portions thereof and decreases in voltage by an amount δ during decreasing portions thereof.

When the signal level F is compared with the modified output signal E, however, it will be noted that the angle gating signals resulting are in phase with the delayed input signals. Thus in this manner the δ delays introduced in the system of utilization have been compensated for.

Although the invention may assume a multitude of specific forms, a particular arrangement is shown to aid those skilled in the art in practicing the invention. Referring again to Fig. 1, it is noted that sharper δ circuit 100 includes an input load resistor R110 having one end connected to an RC filter circuit 120 and the other end connected to ground. RC filter circuit 120 includes a resistor R120 connected to a capacitor C120 having its other end connected to ground. The junction of resistor R120 and capacitor C120 is connected to the grid of a vacuum tube T130 having its cathode connected to a relay 140, the other input terminal of relay 140 being connected to ground. The anode of tube T130 is supplied with a suitable potential.

Relay 140 is actuated to transfer relay contact 140–1 between potentials of −150 volts and 0 volts, providing a sharply varying output signal which is coupled through a capacitor C150 to flip-flop 200. Shaper circuit 100 is also shown as including a capacitor C160 connected to a resistor R160 which is grounded. Capacitor C160 also receives a −150 volt potential through a reset switch, the signal being utilized to reset flip-flop 200.

As shown in Fig. 1, flip-flop 200 may be a conventional circuit, including cross-coupled vacuum tubes T201a and T201b. Since the circuit components of flip-flop 200 are symmetrical with reference to tubes T201a and T201b, only one-half of the connections will be described, it being understood that the other half is similar.

The anode of tube T201a is connected through a load resistor R202a to a source of suitable potential, indicated to be 150 volts. The anode is also cross-coupled to the grid of tube T201b through a resistor R203b connected in parallel to a capacitor C203b. This parallel resistor-capacitor circuit is connected through a resistor R204b and a common biasing resistor R205ab to a suitable source of negative biasing potential, indicated to be −150 volts.

The output signal derived from the anode of tube T201a is designated as signal C and has a waveform similar to that of signal A except that it occurs at one-half the frequency. Signal C then is applied to relay switch circuit 300, which includes a resistor R301 connected to one end of a potentiometer P301 having its other end connected to a source of suitable negative potential, indicated to be −150 volts, through a resistor R302. The center tap of potentiometer P301 is connected to the grid of a tube 310 which has its current path completed through a relay 320 to ground. The anode of tube T310 is supplied with a suitable positive potential, indicated to be +150 volts.

When relay 310 is actuated, contact 310–1 thereof in δ signal generator circuit 400 is transferred. It will be noted that circuit 400 includes a potentiometer P401 for providing a plus δ signal and a potentiometer P402 for providing a minus δ signal. Potentiometer P401 has one end connected to a resistor R401 which receives a suitable positive potential indicated to be 150 volts. The other end of the potentiometer P401 is connected to potentiometer P402 and to ground.

Potentiometer P402 receives a suitable negative potential, indicated to be −150 volts, through a resistor R402. The center taps of potentiometers P401 and P402 provide the plus and minus δ signals, respectively.

Thus when relay 310 is actuated, contact 310–1 is transferred from a position receiving the −δ signal to a position where the +δ signal is received. As a result, the output signal D produced by circuit 400 and derived through contact 310–1, varies between two discrete values representing +δ and −δ.

The signal D then is combined with signal B in adder circuit 500 which includes a first resistor R501 receiving signal B and a second resistor R502 receiving signal D, the junction of resistors R501 and R502 providing the composite output signal E.

The following circuit elements may be utilized in the specific embodiment of the invention, illustrated in Fig. 1.

Shaper circuit 100:
    Resistor R110 _____ 100k ohms.
    Resistor R120 _____ 100k ohms.
    Capacitor C120 _____ .05 microfarads.
    Tube T130 _____ ½ section of type 12AU7.
    Capacitor C150 _____ 470 micromicrofarads.
    Capacitor C160 _____ .01 microfarad.
    Resistor R160 _____ 1 megohm.

Flip-flop 200:
    Tubes T201a, T201b __ ½ section of type 12AT7.
    Resistors R202a, R202b _ 15k ohms.
    Resistors R203a, R203b__100k ohms.
    Capacitors C203a, C203b_.01 microfarad.
    Resistors R204a, R204b__ 100k ohms.
    Resistor R205ab _____ 22k ohms.

Relay switch 300:
    Resistor R301 _____ 150k ohms.
    Potentiometer P301 ___ 500k ohms.
    Resistor R302 _____ 100k ohms.
    Tube T310 _____ ½ section of type 12AU7.

δ Signal generator 400:
    Resistors R401, R402 _____ 47k ohms.
    Potentiometers P401, P402 _____ 100k ohms.

Adder 500:
    Resistor R501 _____ 10k ohms.
    Resistor R502 _____ 100k ohms.

From the foregoing description it is apparent that the present invention provides a simple and efficient solution to the hysteresis problem inherent in track-while-scan systems.

While particular circuit techniques have been introduced, it will be understood that the invention is not so limited. In its basic form the invention may employ any of a multitude of types of δ, or delay-correction signal generators; of switching means for presenting the delay-correction signals; and of combining means for adding the varing scan-indicating signal of the system with the delay-correcting signals. Suitable variations in structure will be apparent to those skilled in the art.

What is claimed is:

1. In a system wherein a scan-indicating signal having increasing and decreasing portions varying linearly at substantially the same rate is compared with a fixed scan-position signal to generate a gating signal, the system having inherent time delays; a circuit for eliminating the effect of the time delays in generating the gating signal, said circuit comprising: first means for generating constant first and second delay-correction signals having levels corresponding to the amplitude change in the scan-indicating signal during an interval equal to the time delay to be eliminated, respectively; second means including an output circuit for switching said first and second delay-correction signals to said output circuit during said increasing and decreasing signal portions, respectively, said second means thereby producing a correcting output signal; and third means for combining the varying scan-indicating signal with said correcting output signal to produce a composite signal which may be utilized to generate gating signals delayed by an amount corresponding to the time delays inherent in the system.

2. The circuit defined in claim 1 wherein said first means includes two series connected potentiometers having ends for receiving first and second potentials corresponding to said first and second signals, said potentiometers including center taps which may be varied in position to provide the desired first and second signal amplitude corresponding to the system delay and change in varying scan signal amplitude.

3. The circuit defined in claim 1 wherein said second means includes a relay switching circuit including a transfer contact providing said output circuit, said relay switching circuit being actuable to transfer said contact between terminals providing said first and second signals in response to an input signal indicating the periods of increasing and decreasing amplitude of said scan-indicating signal.

4. The circuit defined in claim 1 wherein said third means includes a resistance adder having a first resistor for receiving said correcting output signal and a second resistor for receiving the varying scan-indicating signal, the junction of said first and second resistors providing said composite signal.

5. In a system having an inherent time delay for input signals where a scanning signal and a position signal are combined to generate a gating signal for controlling the utilization of the input signals, the scanning signal having scanning periods of linearly increasing amplitude and periods of linearly decreasing amplitude the length of said periods being substantially greater than the time duration for said gating signal; a circuit for eliminating the hysteresis effect resulting from the time delay, said circuit comprising: a δ signal generator for producing a +δ signal having an amplitude corresponding to the increasing change in the scanning signal during the time delay, and for producing a —δ signal having an amplitude corresponding to the decreasing change in the scanning signal during the time delay; a switching circuit coupled to said δ signal generator for receiving said +δ and —δ signals and producing an error-correction output signal having a first level corresponding to said +δ signal during said periods of increasing amplitude and having a second level corresponding to said —δ signal during said periods of decreasing amplitude; and adding means responsive to said error-correction output signal and to the scanning signal for producing a combined output signal which may be utilized to generate gating signals in phase with the corresponding delayed input signals.

6. In a track-while-scan system wherein a varying scanning signal is employed to represent the instantaneous position of an antenna, said scanning signal being compared to a fixed amplitude signal in order to generate an angle gate for the system, said scanning signal being recurrently generated in first and second scanning periods, the scanning signal increasing to a predetermined maximum value during each of said first periods, and decreasing to a predetermined minimum value during said second periods, each of said periods being substantially greater than the period of duration of said angle gate, a circuit for delaying each angle gate to compensate for the delay inherent in the system with respect to signals received through said antenna, said circuit comprising: first and second adjustable signal generators for producing first and second constant signals having amplitudes representing the changes of the scanning signal during an interval corresponding to the system delay for said first and second periods, respectively; a switching circuit for combining said first and second signals to produce a composite correction signal; and means for combining said correction signal and the scanning signal to produce an output signal which may be utilized to control the generating of angle gates delayed by an amount corresponding to the time delay inherent in the system.

7. In the track-while-scan system defined in claim 6 wherein azimuth and elevation scanning is performed through respective antennas, said scanning signal cyclically including two of said first periods for increasing azimuth and elevation scanning, and including two of said second periods for decreasing azimuth and elevation scanning; said circuit further including means for counting every other scanning period to produce a control signal for actuating said switching circuit, whereby the same delay correction may be made for two successive increasing scanning periods for azimuth and elevation and then for two successive decreasing scanning periods for azimuth and elevation.

8. In a system having an inherent time delay for input signals where a scanning signal and a position signal are combined to generate a gating signal for controlling the utilization of the input signals, the scanning signal increasing linearly during first periods to a predetermined maximum value and decreasing linearly during second periods to a predetermined minimum value; a circuit for eliminating the hysteresis effect resulting from the time delay, said circuit comprising: a δ signal generator for producing +δ and —δ signals; a switching circuit coupled to said δ signal generator for receiving said +δ and —δ signals, and for producing an error-correction signal having first level corresponding to said —δ signal during said first periods and a second level corresponding to said +δ signal during said second periods; and adding means responsive to said error-correction output signal and to said scanning signal for producing a combined output signal which may be utilized to control the generating of gating signals in phase with the corresponding delayed input signals.

References Cited in the file of this patent

UNITED STATES PATENTS

| | | |
|---|---|---|
| 2,540,935 | Crane | Feb. 6, 1951 |
| 2,571,017 | Dempsey et al. | Oct. 9, 1951 |
| 2,709,804 | Chance et al. | May 31, 1955 |